No. 890,040. PATENTED JUNE 9, 1908.
F. C. FLYNT.
DRAFTING INSTRUMENT.
APPLICATION FILED MAR. 18, 1907.

WITNESSES:
M. J. Henoch.
W. F. King.

Fitzhugh Cornelison Flynt
INVENTOR

UNITED STATES PATENT OFFICE.

FITZHUGH CORNELISON FLYNT, OF PENSACOLA, FLORIDA.

DRAFTING INSTRUMENT.

No. 890,040.  Specification of Letters Patent.  Patented June 9, 1908.

Application filed March 18, 1907. Serial No. 362,866.

*To all whom it may concern:*

Be it known that I, FITZHUGH CORNELISON FLYNT, a citizen of the United States, residing at Pensacola, in the county of Escambia and State of Florida, have invented a new and useful Drafting Instrument, of which the following is a specification.

My invention relates to a combination of rolling protractor, prick points, straight edge, rulers, scales for measuring distance and arrangements for adjusting all the above mentioned parts so that by means of the combination, drawings, plats of surveys and other plans requiring angles, distances and straight lines, may be made speedily, accurately and neatly.

Reference is made to the accompanying drawings which show the manner of combination, and in which similar letters refer to similar parts.

Figure 1:
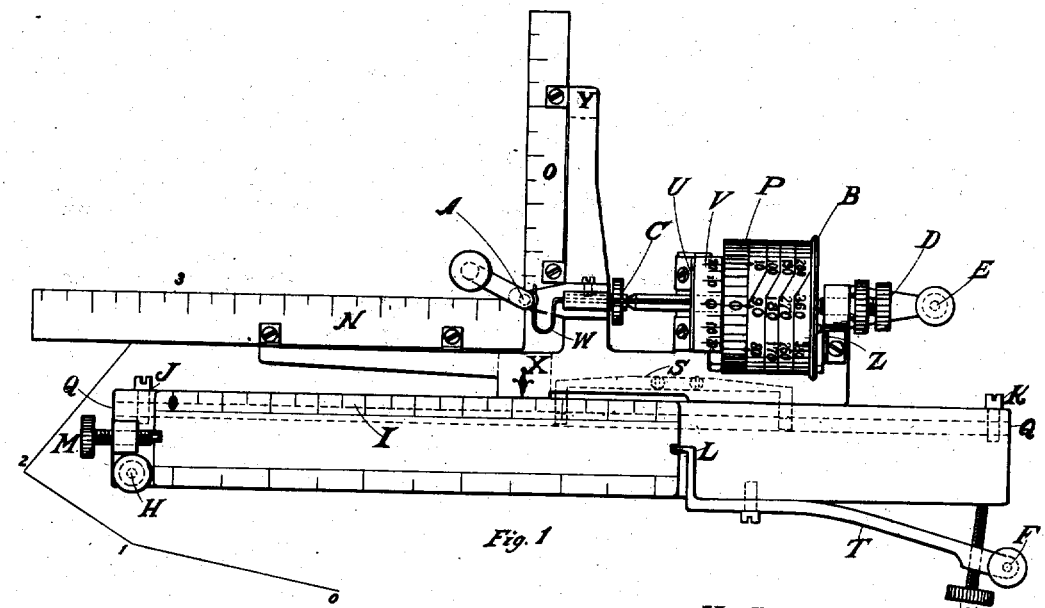
Figure 2:
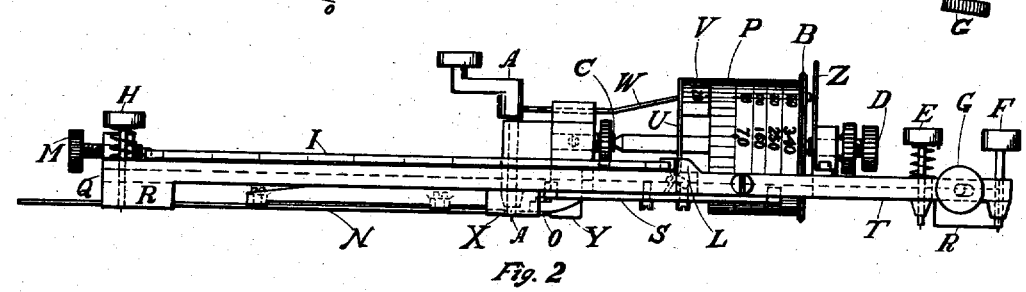
Figures 3, 4:
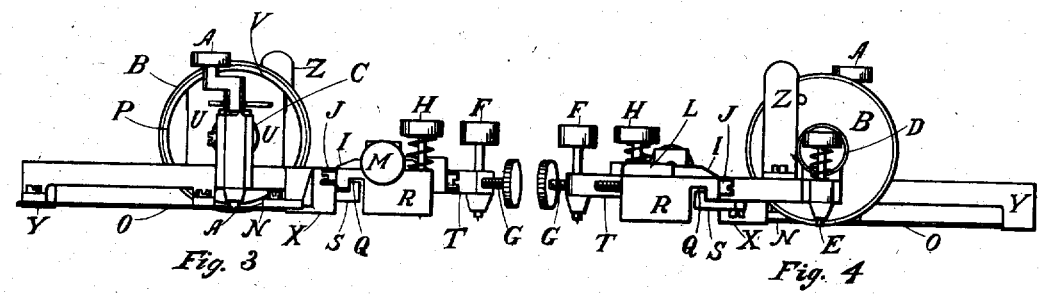

Figure 1 is an orthographic plan and shows the instrument as being used in platting a survey. The points of the survey are shown by the small numerals 0, 1, 2, 3, and the last line platted lies along the ruler N from point 3 to the prick point A which marks the extremity of the line. Fig. 2 is a side elevation of the instrument. Fig. 3 is an elevation of the left end; and Fig. 4 is an elevation of the right end.

The rolling protractor P B, rulers N and O, and prick points A and E are shown carried on the frame X Y. The frame has downward projections X and Y which slide on the drawing paper. The disk B (which with the cylinder P forms the rolling protractor) also rests on the paper and is the remaining point of support for the frame X Y. The frame is held in sliding contact with the straight edge J K by the spring S engaging in the groove Q, and when the said frame slides along the straight edge J K the index over X serves to indicate distances on the principal scale I. Scale I is shown reversible, and is held along the straight edge J K by screw M and spring L. This method of fastening makes the scale I quickly removable, so that scales of any division may be used, and by turning the screw M the zero of the scale I can be adjusted to coincide with the index on the frame X Y when that frame is in contact with the stop screw at J. The flat bar of which J K is the straight edge has on its underside the groove Q and a projection downward at each end that rests on the paper. These projections are marked R. Through one of these projections passes the prick point H which has a spring to keep the point above the paper except when pressed down. Spring T is a continuation of spring L, both being fastened to the aforesaid flat bar by the screw as shown. Prick point F passes vertically through spring T and remains down unless lifted. Screw G passes horizontally through spring T and presses against the side of the said flat bar near its end. Then if prick points F and A be pressed down, turning the screw G will cause slow motion of the instrument about pivot point A, and the position of the index at X relatively to scale I will be practically unchanged for the small angles through which the slow motion is used; and should the index move from zero, or the position set, it can readily be readjusted by means of screw M.

The rolling protractor is formed of a graduated cylinder P and the disk B which rotate together on the horizontal axle shown pivoted in adjusting screws C and D. The prick point A is at a distance from the disk B proportional to the diameter of that disk. Prick point A is used as a pivot or vertical axis. The line of the horizontal axis of disk B intersects that vertical axis. Therefore when disk B rolls about pivot A the amount of rotation of cylinder P for each unit of horizontal arc is known, and the cylinder is graduated accordingly. A convenient proportion is: diameter disk B equal 1; distance from pivot A to disk B equal 2. Then disk B and cylinder P rotate four times while disk B describes one complete circumference about pivot A, and cylinder P should be graduated with 90 degrees of arc and can be read by vernier V as closely as desired. The protractor may be quickly set at zero by pressing on spring stop Z and turning the cylinder P with attached disk B until a projection properly located on disk B comes in contact with stop Z.

The protractor may be held at any setting by turning the pivot pin A whose upper part forms a crank above an eccentric which presses against the spring rod W which pushes vernier V against cylinder P. Vernier V is supported on flat springs U that permit the aforesaid motion of the vernier.

Rulers N and O are shown with auxiliary scales to be used in taking measurements about point A without moving forward the principal parts of the instrument. These scales may be replaced so that different scales may be used.

Prick point E has a spring to hold it above the paper except when pressed down. The object of prick point E is when pressed down to prevent frame X Y from rotating about pivot A.

Adjusting screws C and D serve to set disk B at proper distance from pivot A as well as to keep proper tension on the axle of disk B.

Spring S is fastened by screws to the under side of frame X Y and engaging in the groove Q holds the frame with proper pressure against the straight edge J K, allowing it to slide as before mentioned.

Ruler O is at right angles to ruler N and their ruling edges intersect at pivot A. Ruler N is parallel to straigh tedge J K. The axis of disk B is parallel to straight edge J K.

To use for platting a survey by compass bearings, set prick point A at point of beginning plat. With prick point F lifted slide straight edge J K until frame X Y reaches contact with stop screw at J, then index at X should indicate zero on scale I. Set the protractor at zero and ruler N in the line considered north and south. With prick point F lifted and keeping stop screw J in contact with frame X Y, turn the entire instrument around point A as a pivot until the protractor indicates approximately the required bearing, then point F is lowered and the exact bearing set by turning screw G. If the index has moved from zero, re-set it by screw M. Press down on point H to fix straight edge in position. Turn pivot A to clamp the protractor P and lifting pivot A slide the frame X Y until the index at X indicates on the scale I the length of the first line of the survey. Lower point A, which pricks the extremity of said line and the new angle point. The first line now lies along ruler N and can be drawn with pen or pencil. Press down on point E, to fix the frame X Y in position, release point H and lifting point F slide the straight edge again to zero and lower point F. Release point E, turn pivot A to release protractor and with point F lifted turn the instrument as before approximately to the new bearing; set exact bearing by lowering F and turning G; correct error of index if any. Press point H and lifting and turning pivot A slide the frame until index shows length of second line. Lower point A and rule the second line. The foregoing process is repeated until the entire survey is platted. With the protractor graduated as shown the instrument would be used in a manner similar to above to plat a survey by azimuths or "continuous vernier." If desired the protractor can be set at zero for each angle and the angle then turned as above.

In platting stadia surveys where many angles and distances are measured from the same point, the distances can be measured on the scales at N and O, while the protractor measures the angles. To draw a long line the frame X Y and straight edge J K are moved forward alternately and no angles turned until the desired length is reached.

Similar methods to those above described would be followed in using the instrument to make other drawings than plats of surveys, and to one skilled in such matters the uses will be apparent from the drawings.

The change of position of the prick points, or the omission of parts of the instrument and the use of the remaining parts for the purposes and in the manner herein set forth will not be a departure from the spirit of this invention.

Having described my invention and its use, I claim as new and desire to secure by Letters Patent, the drafting instrument substantially as hereinbefore described, consisting of two principal combinations mutually dependent—as follows:

1. The combination, in a drafting instrument, of a flat bar having a groove and a straight edge, the said straight edge being formed by the edge of the flat bar parallel to the groove; two stop screws on the straight edge to properly limit the motion of a frame along said straight edge; fastenings on the flat bar for a measuring scale, the fastenings being a horizontal screw at one end of the flat bar, the screw pressing against the end of the scale nearest the zero point, and a spring pressing the other end of the scale, the fastenings being arranged to make the scale adjustable with regard to an index and also to make the scale removable; measuring scales having a zero point near one end and suitable divisions, these scales to be held along the aforesaid straight edge by the said fastenings; a prick pin located near the end of the flat bar nearest the zero point of the scale; a spring to keep the prick pin lifted except when pressed down; a side spring on the flat bar near the end farthest from the zero point of the scale; a prick pin, arranged to be lifted and lowered, passing vertically through the end of the side spring, and a screw passing horizontally through the side spring near its end, pressing against the side of the flat bar and arranged to cause, when turned, slow rotation of the instrument when the prick pin is fixed.

2. The combination, in a drafting instrument, of a frame properly shaped carrying the combination, as follows: a rolling protractor having a projection to strike a stop spring and having means of adjustment relative to the pivot about which it rolls; a stop spring to set the protractor at zero; a pivot pin with prick point arranged to be lifted and lowered so that when lifted the frame can be moved to new positions and when lowered it forms a fixed pivot around which the protractor rolls and the frame slides; a vernier to be used in reading angles on the protractor; flat springs to support the vernier; means of pressing the vernier against the protractor to act as a clamp; two rulers having changeable measuring scales and at right angles to each other, the lines of the ruling edges intersecting at the aforesaid pivot pin, one of the rulers being parallel to the axis of the rolling protractor and to the straight edge of a flat bar along which the frame slides; an index to indicate distances on a scale as the frame is moved along the said straight edge; a prick pin to be pressed and prevent the frame turning about the pivot; a spring to keep the prick pin lifted except when pressed down; a spring to engage in a groove in a flat bar and thereby hold the frame in proper sliding contact with the straight edge of the flat bar, the spring thus serving to connect the two dependent combinations, also as part of the combination but not carried by the frame a flat bar having a groove and a straight edge.

FITZHUGH CORNELISON FLYNT.

Witnesses:
    WM. F. LEE,
    F. R. GOULDING.